March 8, 1960  D. R. CRAIG  2,927,520
PHOTOGRAPHIC METHOD AND APPARATUS
Filed June 23, 1958

INVENTOR
DWIN R. CRAIG
BY
ATTORNEY

United States Patent Office 2,927,520
Patented Mar. 8, 1960

2,927,520

PHOTOGRAPHIC METHOD AND APPARATUS

Dwin R. Craig, Falls Church, Va., assignor to Logetronics, Inc., Alexandria, Va., a corporation of Delaware Application June 23, 1958, Serial No. 743,778

10 Claims. (Cl. 95—73)

This invention relates to photographic methods and apparatus primarily intended for use in printing operations.

The invention embodies improvements in the methods and apparatus known in the art as exemplified by those disclosed in copending applications Serial No. 453,747, filed September 2, 1954, now patent No. 2,842,025, and Serial No. 666,126, filed June 17, 1957. These known disclosures relate to methods of automatic dodging wherein the use of a scanning light beam is proposed for exposing a photosensitive surface through a transparency and modifying the exposure by varying the light beam as a function of the intensity of light passing through the transparency. In the one case, the exposure is varied by modifying the intensity of the light beam while in the other the length of time that each incremental area is exposed to the light beam is varied.

Whereas these prior art disclosures represent vast improvements over methods and apparatus known previously thereto, they fail to take into account such variations which occur where the transparency contains portions which have been exposed at low levels and other portions which have been exposed at higher density levels representing highlights in the original scene. Accordingly, it is among the objects of the present invention to correct conditions arising from variation in detail contrast within a negative or other transparency where it varies from one portion to another because of different exposure levels. These differences in exposure levels are due primarily to the S-shaped characteristic if all photosensitive material causing parts of the image exposed at low levels, corresponding to shadow areas in the original scene to exhibit much lower detail contrast than in the case of the higher density levels representing highlights in the original scene. A print made from this type of negative with automatic dodging methods and apparatus of the types previously disclosed will reveal that detail contrast in the shadowed areas of the negative was much lower than in the highlight areas, a condition which becomes more noticeable when both of such areas have been exposed to the same print density.

Accordingly, the present invention includes the automatic dodging methods and apparatus of the disclosures mentioned in the foregoing and in addition, modifies the color of the scanning light beam in conjunction with the use of a photosensitive material whose reproduction characteristic in a function of the color of the exposing light employed. In other words, such material has a plurality of gamma values each of which is a function of the color of light to which it is exposed. Such color responsive photosensitive materials are already commercially available as exemplified by "Varigam" produced by E. I. du Pont de Nemours, Wilmington, Delaware, "Varaloid" sold by Haloid-Xerox Company, Rochester, New York, and "Polycontrast" sold by Eastman Kodak Company, Rochester, New York. In the case of each of these three examples, one of the components of the photosensitive emulsions responds only to blue light exhibiting a high contrast reproduction characteristic, the other component responding only to green light exhibiting a low contrast reproduction characteristic. Whereas these three photosensitive materials are at present available only on a paper base, Gevaert Photo-Production, N.V., Antwerp, Belgium, produces a photosensitized film base wherein the high contrast and low contrast components are sensitive to green light and blue light respectively, as compared with the reverse condition provided by the paper coated products.

A cathode ray tube is preferably employed as the light source in conjunction with the present invention and to qualify, it must be capable of control to produce variable exposure and also to produce variable color. Inasmuch as the color emitted by a cathode ray tube is a function of the fluorescent phosphor provided on its face, the cathode ray tube required in the present instance must include at least two phosphors having different color characteristics. In order to cooperate with the types of photosensitive surfaces described as being commercially available at this time, one of the phosphors must produce blue light when energized by the electron beam while the other must produce green light. Moreover, the cathode ray tube must provde means for selectively energizing the phosphors of different color characteristics throughout the scanning operation.

Three known types of cathode ray tubes satisfying these requirements are the Radio Corporation of America color television receiving tube, the Lawrence tube, and a tube developed largely by General Electric Company and Navel Research Laboratories. The RCA color television receiver tube comprises two electron guns, a shadow mask, and two different types of phosphors deposited in the form of dots. The Lawrence tube comprises a single electron gun and two phosphor types deposited in alternate stripes for excitation by the electron beam. The third type of tube available employs transparent phosphor coatings arranged in superimposed relationship so that light emitted from one of the layers will pass through the other in unobstructed fashion. The two layers can be energized selectively by modifying the accelerating potential. Below a certain energy range, only one of the layers is energized. Above this energy range such layer becomes transparent to the electrons whose energy will become dissipated in the other layer.

In any case, the phosphors selected for coating the face of the cathode ray tube will match the spectral response characteristics of the components of the emulsion constituting the photosensitive surface.

To illustrate the need for the present invention, it can be assumed that an aerial photograph of the earth is made on a sunny day in the presence of lightly scattered cumulus clouds. Under these circumstances, a portion of the terrain will be illuminated by bright sunlight while another portion will lie in the shadows of the clouds. In the resulting negative, that portion of the image which represents the brightly lighted terrain would be exposed well into the linear portion of the characteristic of the photographic film. The portion of the image representing the shadowed terrain would be exposed on the toe or low density portion of the characteristic curve of the film. Accordingly, detail in the brightly lighted portion would possess high contrast as compared with that in the shadowed portion. A conventional contact print produced from such a negative, when exposed for the detail in the highlights, would show nothing but a large black area to correspond with the shadowed portion. The same negative printed on the same grade of paper with the use of automatic dodging of the type known prior to the present invention would remove the large black area representing the clouded portion by imparting to it the same average print density as in the brightly lighted area, but thus revealing the low detail contrast inherent in that portion of the negative. A print produced from the same negative in accordance with the present invention wherein the color of the exposing beam is varied as a function of the sensed intensity, and employing one of the three variable contrast papers mentioned in the foregoing, the scanning light would be green while exposing the brightly illuminated portion of the scene so as to print this region on the low contrast emulsion and would be blue whenever the beam encountered a thin portion of the negative, printing these portions on the high contrast emulsion. In this manner, the brightness of the scanning beam is controlled as a function of sensed intensity to perform the automatic dodging function as previously known, and in addition, the color of the beam is controlled as a function of the sensed intensity to perform what has been termed "dynamic contrast control." It will be clear that sensed intensities lying between the minimum and maximum will produce a mixture of the blue and green light, exposing both emulsions to some extent and producing some intermediate value of contrast lying between the two extremes.

Accordingly, the present invention includes among its objects a photographic method comprising directing a light beam having a variable color characteristic through a transparency and forming a real image thereof on a photosensitive surface having a reproduction characteristic which varies as a function of the color of light to which it is exposed, scanning the transparency with the beam, continuously sensing the intensity of light directed from the beam through the transparency, and modifying the color of the beam as a function of the intensity. The method contemplates simultaneously modifying the beam to vary the exposure of the photosensitive surface as a function of the intensity sensed. More specifically, the invention contemplates simultaneously modifying the intensity of the beam as a function of the sensed intensity. The variable color characteristic and reproduction characteristic contemplated by the examples described herein lie in the blue-green portion of the spectrum.

The invention also contemplates photographic apparatus comprising supporting means for a transparency and a photosensitive surface whose reproduction characteristic varies as a function of the color of light to which it is exposed, a light source producing a beam of variable color scanning the transparency and exposing the surface, light intensity sensing means disposed in the path of light traversing the transparency from the source, and means in circuit with the sensing means and light source modifying the color of the beam as a function of intensity sensed by the sensing means. The light source is preferably a cathode ray tube having phosphor coatings of different color characteristics. The apparatus preferably includes means in circuit with the sensing means and light source for modifying the beam to vary the exposure of the photosensitive surface as a function of intensity sensed by the sensing means. It is also contemplated that the apparatus include means in circuit with the sensing means and light source for varying the intensity of the beam as a function of the intensity sensed by the sensing means.

A more complete understanding of the invention will follow from a description of the accompanying drawings wherein.

Figure 1:
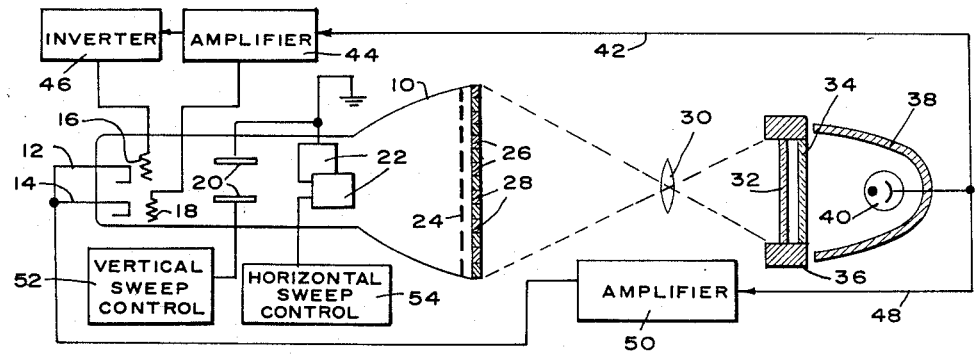
Fig. 1 is a diagrammatic representation of one form of the invention.

The arrangement depicted in Fig. 1 includes a cathode ray tube 10 having a pair of cathodes 12 and 14, a pair of control electrodes 16 and 18, vertical deflection plates 20, horizontal deflection plates 22, a mask 24, and two arrays of phosphor dots 26 and 28 having different color characteristics respectively alternately arranged. Light produced by the cathode ray tube will be directed through a suitable optical system 30 and a negative or other transparency 32 to an element 34 bearing a photosensitive coating. The negative and photosensitive element are provided with a suitable support 36 behind which there is arranged a light collector 38 containing a photoelectric cell or photomultiplier tube 40. The phototube 40 has its output connected with a lead 42 connected with an amplifier 44 and an inverter 46 which respectively connect with the control electrodes 18 and 16 to vary the relative excitation of the arrays of dissimilar phosphor dots 26 and 28 as a function of the intensity sensed by the phototube 40. The output of the phototube 40 is also connected by a lead 48 to an amplifier 50 to provide a feedback control for the cathodes 12 and 14 so as to modify the intensity of the light beam produced by the cathode ray tube as a function of the intensity sensed by the phototube 40. Where it is desired to control the dwell periods of the light beam rather than its intensity, the vertical sweep control 52 and horizontal sweep control 54 can be made subject to control by the output of the amplifier 50 in a manner clearly disclosed in copending application Serial No. 666,126, filed June 17, 1957.

Figure 2:
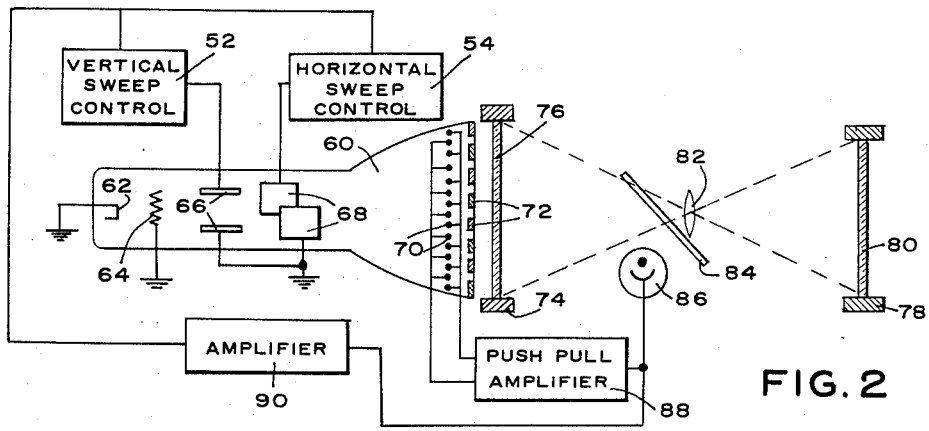
Fig. 2 is a diagrammatic representation of a second form of the invention.

Whereas the embodiment described with reference to Fig. 1 illustrates an arrangement using the RCA tube, Fig. 2 of the drawings illustrates the use of the Lawrence tube. In this case, the cathode ray tube 60 is provided with a cathode 62, a control electrode 64, vertical deflection plates 66, horizontal deflection plates 68, color grids 70, and alternate phosphor stripes 72 having different color characteristics. In this embodiment, an enlarger has been indicated as including a support 74 for a negative or other transparency 76, a support 78 for a photosensitized element 80, an optical system 82 interposed between the transparency and photosensitive element, and a semi-mirror 84 for directing a portion of the light traversing the transparency 76 to the phototube 86 whose output is connected to a push-pull amplifier 88 and a feedback amplifier 90. The feedback amplifier 90 is connected with the vertical sweep control 52 and/or the horizontal sweep control 54 to provide a negative feedback to control the scanning velocity of the light beam as an inverse function of the intensity sensed by the phototube 86. The push-pull amplifier 88 modifies the ratio of the light of the two different colors as a function of the intensity sensed by the phototube 86. Thus, here again are the combined effects of automatic dodging and color control produced as functions of the intensity of light directed through the transparency for exposing the photosensitive surface.

Figure 3:
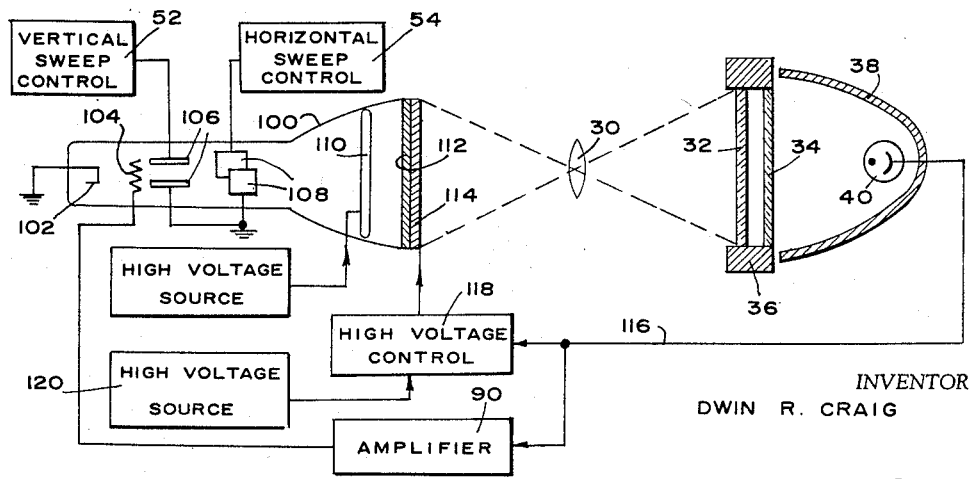
Fig. 3 is a diagrammatic showing of a third form of the invention.

The cathode ray tube 100 depicted in Fig. 3 includes a cathode 102, a control grid 104, vertical deflection plates 106, horizontal deflection plates 108, a post accelerator ring or grid 110 and superimposed transparent phosphor layers 112 and 114. Light produced by these phosphor layers will be directed through an optical system 30 and transparency 32 to a photosensitized element 34 behind which there is provided a light collector 38 containing a phototube 40 in an arrangement similar to that depicted in Fig. 1. The output of the phototube is connected by means of a lead 116 with a high voltage control device 118 for varying the value of the voltage applied to the phosphor layers 112 and 114, the voltage being supplied by a suitable high voltage source 120. In one form of this cathode ray tube, the phosphor coating 112 becomes energized at approximately eight kilovolts, but at approximately sixteen kilovolts this coating fails to impede the electrons which then energize the coating 114 causing it to emit light of its characteristic color. The output of the phototube 40 is also connected to the feedback amplifier 90 which is connected to the control electrode 104 to modify the intensity of the scanning beam inversely as a function of the intensity sensed by the phototube 40.

It is of course known that:

$$E = It$$

where $E$ is exposure, $I$ is intensity of the exposing light, and $t$ is the exposure time.

In the present case, the relationship becomes:

$$E_B + E_G = (I_B + I_G)t$$

where $E_B$ is exposure by blue light, $E_G$ is exposure by green light, $I_B$ is intensity of blue light, $I_G$ is intensity of green light, and $t$ is time of exposure.

Under these circumstances, using intensity modulation, $t$ is constant and $$(I_B + I_G) = f_1(d)$$

$$I_B/I_G = f_2(d)$$

where $d$ is the density of an elemental area of the transparency.

Where velocity modulation is employed, $(I_B + I_G)$ is constant and $$t = f_1(d)$$

$$I_B/I_G = f_2(d)$$

where again $d$ is the density of an elemental area of the transparency.

Although a limited number of illustrations have been described, the invention should not be limited thereto beyond the scope of the appended claims.

I claim:

1. A photographic method comprising directing a light beam having a variable color characteristic through a transparency and forming a real image thereof on a photosensitive surface having a plurality of dissimilar gamma values each of which is a function of the color of light to which it is exposed, scanning said transparency with said beam, continuously sensing the intensity of light directed from said beam through said transparency, and continuously modifying the color of said beam as a function of said intensity regardless of color.

2. A photographic method as set forth in claim 1 comprising simultaneously modifying said beam to vary the exposure of said photosensitive surface as a function of said intensity.

3. A photographic method as set forth in claim 1 comprising simultaneously modifying the intensity of said beam as a function of said sensed intensity.

4. A photographic method as set forth in claim 1 wherein said variable color characteristic and reproduction characteristic lie in the blue-green portion of the spectrum.

5. Photographic apparatus comprising supporting means for a transparency and a photosensitive surface having a plurality of gamma values each of which is a function of the color of light to which it is exposed, a light source producing a beam of variable color scanning said transparency and exposing said surface, light intensity sensing means disposed in the path of light traversing said transparency from said source, and means in circuit with said sensing means and light source continuously modifying the color of said beam as a function of intensity sensed by said sensing means and independent of the color of said beam.

6. Photographic apparatus as set forth in claim 5 wherein said light source is a cathode ray tube having phosphor coatings of different color characteristics.

7. Photographic apparatus as set forth in claim 5 wherein means in circuit with said sensing means and light source modifies said beam to vary the exposure of said photosensitive surface as a function of intensity sensed by said sensing means.

8. Photographic apparatus as set forth in claim 5 wherein means in circuit with said sensing means and light source varies the intensity of said beam as a function of the intensity sensed by said sensing means.

9. A photographic method as set forth in claim 1 comprising simultaneously modifying the scanning velocity of said beam as a function of said sensed intensity.

10. Photographic apparatus as set forth in claim 5 wherein means in circuit with said sensing means and light source varies the scanning velocity of said beam as a function of the intensity sensed by said sensing means.

References Cited in the file of this patent

UNITED STATES PATENTS

| | | |
|---|---|---|
| 2,757,571 | Loughren | Aug. 7, 1956 |
| 2,764,060 | Horak | Sept. 25, 1956 |